US009744895B2

(12) United States Patent
Wiegand et al.

(10) Patent No.: US 9,744,895 B2
(45) Date of Patent: *Aug. 29, 2017

(54) SYSTEMS AND METHODS OF PROVIDING VISUAL GUIDANCE TO ASSIST IN POSITIONING A BOAT AND TRAILER IN LOW LIGHT CONDITIONS

(71) Applicant: AQUALANE, LLC, Indianapolis, IN (US)

(72) Inventors: Nicholas Karl Wiegand, Indianapolis, IN (US); Dilshan Thilina Modaragamage, Barrie (CA)

(73) Assignee: AQUALANE, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,770

(22) Filed: Mar. 30, 2016

(65) Prior Publication Data

US 2016/0207437 A1 Jul. 21, 2016

Related U.S. Application Data

(63) Continuation of application No. 14/473,477, filed on Aug. 29, 2014, now Pat. No. 9,308,851.

(60) Provisional application No. 61/872,144, filed on Aug. 30, 2013.

(51) Int. Cl.
| | |
|---|---|
| *G08G 3/00* | (2006.01) |
| *B60P 3/10* | (2006.01) |
| *B63B 22/16* | (2006.01) |
| *B60D 1/36* | (2006.01) |
| *B63C 3/02* | (2006.01) |
| *B63C 3/12* | (2006.01) |

(52) U.S. Cl.
CPC .............. B60P 3/1075 (2013.01); B60D 1/36 (2013.01); B60P 3/1033 (2013.01); B63B 22/166 (2013.01); G08G 3/00 (2013.01); B63C 3/02 (2013.01); B63C 3/12 (2013.01)

(58) Field of Classification Search
CPC ........ B60P 3/1075; B60P 3/1033; B60D 1/36; B63B 22/166; B63C 3/02; B63C 3/12; G08G 3/00
USPC ........................ 340/985; 114/344; 116/28 R; 280/414.1; 414/483
See application file for complete search history.

(56) References Cited

U.S. PATENT DOCUMENTS

| | | | | |
|---|---|---|---|---|
| 3,750,805 | A * | 8/1973 | Finney ................... | B60P 3/1058 280/414.1 |
| 3,837,509 | A * | 9/1974 | Gladnick .............. | B60P 3/1075 280/414.1 |
| 5,013,206 | A * | 5/1991 | Ernst ..................... | B60P 3/1033 114/344 |
| 5,596,944 | A * | 1/1997 | Massie .................. | B60P 3/1075 116/202 |

(Continued)

*Primary Examiner* — John A Tweel, Jr.
(74) *Attorney, Agent, or Firm* — Ulmer & Berne, LLP

(57) ABSTRACT

Embodiments described herein include a visual guidance system for a boat trailer that can include a housing defining a cavity, the housing having a plurality of openings such that fluid can pass into the cavity, a first track and a second track, where the first track and the second track have a substantially vertical orientation, and a laser head mounted on the first track and the second track that can include a housing, a laser module positioned within the housing that is configured to provide a first illumination beam, and a float.

20 Claims, 7 Drawing Sheets

(56) References Cited

U.S. PATENT DOCUMENTS

| | | | | |
|---|---|---|---|---|
| 6,318,747 | B1* | 11/2001 | Ratican | B60D 1/36 |
| | | | | 116/28 R |
| 6,923,138 | B2* | 8/2005 | Holbrook | B60P 3/1066 |
| | | | | 114/344 |
| 8,044,776 | B2* | 10/2011 | Schofield | B60C 23/00 |
| | | | | 340/425.5 |
| 9,308,851 | B2* | 4/2016 | Wiegand | B60P 3/1033 |
| 2003/0200911 | A1* | 10/2003 | Tatro | B60D 1/36 |
| | | | | 116/28 R |
| 2011/0008139 | A1* | 1/2011 | Hey | B60P 3/1016 |
| | | | | 414/495 |
| 2013/0309053 | A1* | 11/2013 | Cameron | B60P 3/1025 |
| | | | | 414/537 |
| 2016/0207437 | A1 | 7/2016 | Wiegand et al. | |

* cited by examiner

SYSTEMS AND METHODS OF PROVIDING VISUAL GUIDANCE TO ASSIST IN POSITIONING A BOAT AND TRAILER IN LOW LIGHT CONDITIONS

REFERENCE TO RELATED APPLICATIONS

This application is a continuation of U.S. non-provisional application Ser. No. 14/473,477, filed Aug. 29, 2014, which claims priority to U.S. Provisional Patent Application No. 61/872,144 filed Aug. 30, 2013, which are hereby incorporated herein by reference in their entirety.

TECHNICAL FIELD

Embodiments of the technology relate, in general, to a visual guidance system and method for assisting in docking a boat, and in particular to a system and method of using collimated light illumination to provide visual guidance as to the position of a boat trailer as it is moved down a boat ramp and submerged or partially submerged in water.

BACKGROUND

Boats and other watercraft are often transported on trailers pulled behind vehicles, where the trailers can be difficult to navigate into a desirable location, such as a boat ramp. It can also be challenging to dock a boat or other watercraft with a waiting trailer due to poor visibility, darkness, and other factors.

SUMMARY

A visual guidance system for a boat trailer can include a guidance system housing defining a cavity, the guidance system housing having a plurality of openings such that fluid can pass into the cavity defined by the guidance system housing, a first track opposite a second track and positioned within the cavity defined by the guidance system housing, where the first track and the second track have a substantially vertical orientation, a first laser head, the first laser head being coupled with the first track and the second track, wherein the first laser head is pivotally and vertically moveable relative to the first track and the second track, the first laser head including a first housing defining a first housing cavity, a first laser module positioned within the housing cavity configured to provide a first illumination beam, a first float coupled with the first housing, and a first window coupled with the first housing such that the first illumination beam is configured to pass through the first window. The visual guidance system can include a first position, where the first laser head is buoyed by fluid within the housing; and a second position, where the first laser head is unbuoyed.

A visual guidance system for a boat trailer can include a housing, a tracking means associated with the housing, an illumination means coupled with the tracking means and positioned at least partially within the housing, and a floating means associated with the illumination means.

A method for providing visual guidance for a boat trailer can include the steps of providing a visual guidance system including a housing, a track positioned within the housing, and a laser head having a laser module, where the laser head is coupled with the track such that the laser head is movable in a substantially vertical direction, coupling the visual guidance system with a boat trailer, illuminating the laser module of the laser head to create an illumination beam, and guiding a boat onto the boat trailer using the illumination beam.

BRIEF DESCRIPTION OF THE DRAWINGS

The present disclosure will be more readily understood from a detailed description of some example embodiments taken in conjunction with the following figures.

DETAILED DESCRIPTION

Figure 1:
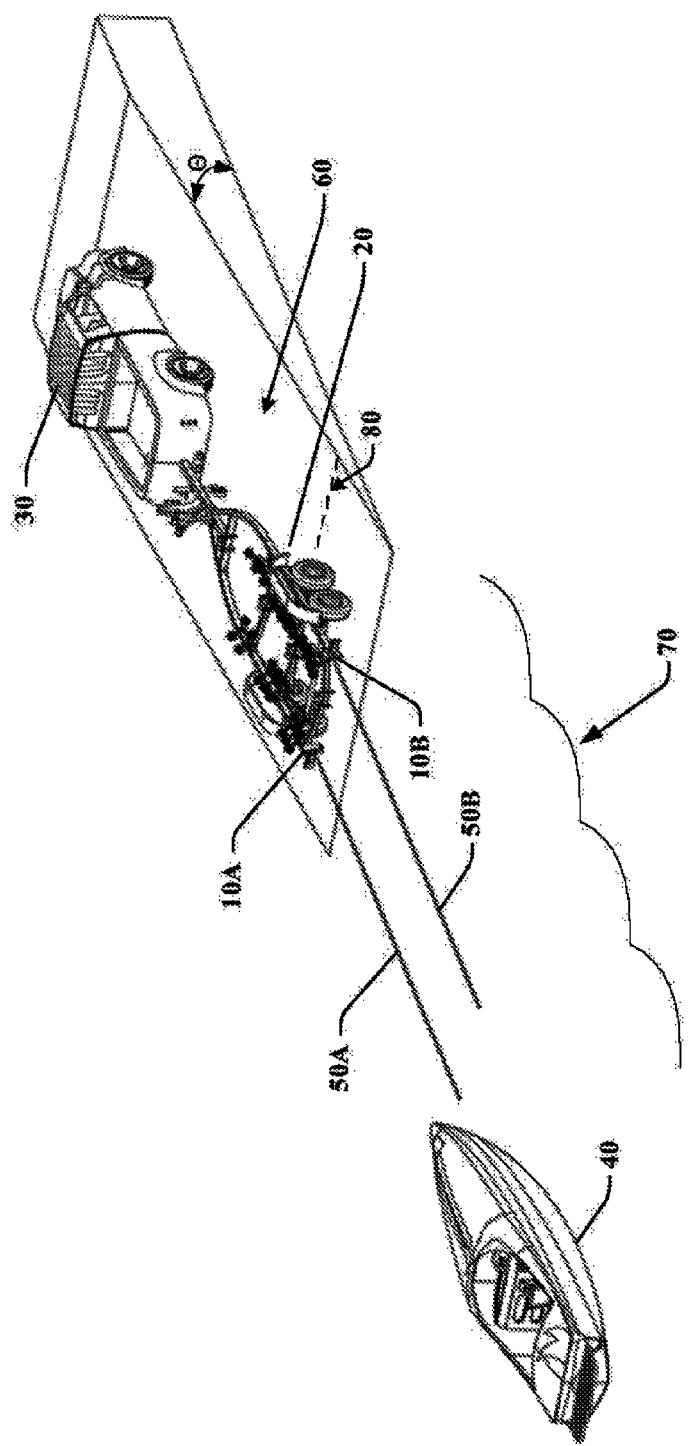
FIG. 1 is an isometric or orthographic view of a visual guidance system deployed on a boat trailer according to one embodiment.

Various non-limiting embodiments of the present disclosure will now be described to provide an overall understanding of the principles of the structure, function, and use of the apparatuses, systems, and methods disclosed herein. One or more examples of these non-limiting embodiments are illustrated in the accompanying drawings. Those of ordinary skill in the art will understand that the apparatuses, systems, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of apparatuses, systems, and methods for providing visual guidance for securing a boat to a trailer in low light conditions. Generally, a boat can be removed from water by docking the boat to a submerged or partially submerged trailer and then removing the trailer with the boat from the water. Although reference to a trailer is made throughout this paper, the present invention is also applicable to other suitable systems and apparatuses for removing boats from the water, or placing boats into the water, including but not limited to boat lifts and boat docks. The term trailer is not limited to boat trailers but can also refer to any other suitable types of trailers including but limited to trailers adapted for use with jet skis or other personal watercraft.

The operation of securing a boat to a trailer is typically performed at a boat ramp, a gradually sloped roadway that assists in unloading and loading boats from trailers. It can be difficult for the driver of the boat, or the driver of a vehicle towing the trailer, to clearly see the exact position and attitude of the trailer. The operation may be performed at the end of the day, when lighting conditions are deteriorating, at night when lighting conditions may be poor, early in the morning before lighting conditions are ideal, or when inclement weather is present, for example when it is storming. In these conditions, it can be especially difficult for a driver to see the trailer clearly or at all. Further, once the trailer is submerged or partially submerged in the water, the water can make it particularly difficult to see the submerged portions of the trailer. The visual guidance system can use lasers to provide a clear illuminated set of underwater or on-water beams that a driver can use to determine the position of the trailer. Although the visual guidance system can be particularly useful for low light conditions, the visual guidance system can also be used in, or configured for use in, normal or intense light conditions.

In one example embodiment, the visual guidance system can provide visual indications for a driver of a boat who is attempting to position the boat for docking with a trailer. In an embodiment, the visual guidance system provides visual indications for a driver of a vehicle who is attempting to position a trailer into the water for docking with a boat. In various embodiments, the visual guidance system can use a single laser, a single laser that is split into multiple beams, multiple lasers, or multiple lasers and a set of beams. In embodiments, the visual guidance system comprises a laser that illuminates the surface of the water and/or a laser that illuminates submerged areas of the water. In embodiments, the one or more beams can convey position and/or rotational information about the trailer. Any suitable light source such as, for example, LED, incandescent, halogen, or combinations thereof is contemplated.

The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Referring now to FIG. 1, an isometric or orthographic view of a visual guidance system 10a and 10b (collectively visual guidance system 10) is presented. The visual guidance system 10 can include any suitable number of units. In the configuration illustrated in FIG. 1, the visual guidance system 10 is deployed on the left and right rear portions of a trailer 20 for hauling a boat 40 that is towed by a vehicle 30 such as a truck. The visual guidance system 10 can be mounted to the trailer 20, for example as an aftermarket device, or can be integrated into the trailer 20. The driver of the vehicle 30 positions the trailer 20 such that a boat 40 or other water craft can be loaded onto the trailer 20 and hauled out of the water 70. The visual guidance system 10 can produce illumination beams 50a and 50b (collectively illumination beams 50) that can be seen by the driver of the vehicle 30 and the driver of the boat 40. The illumination beams 50 can be produced by one or more lasers, mirrors, optical splitters and filters, or other optical system as would be known and understood in the art and as described below.

The visual guidance system 10 can produce underwater and/or on-water illumination beams 50 to assist in guiding the boat 40 and/or the trailer 20 into position for docking the boat 40 with the trailer 20. As the vehicle 30 travels down an incline θ of a boat ramp 60, the illumination beams 50 can provide visual cues to the driver of the vehicle 30 that is towing the trailer 20. For example, the illumination beams 50 can provide visual cues as to the direction and path of travel of the trailer 20. In this way, the driver of the vehicle 30 can be provided real-time visual feedback as the driver is backing down the boat ramp 60 that can help the driver of the vehicle to make timely corrections to the direction of travel of the trailer 20. This can assist the driver of the vehicle 30 in planning an approach path so that the trailer 20 enters the water 70 at the desired spot at the edge 80 of the water 70 at the bottom of the boat ramp 60.

As the trailer 20 enters the water 70 and submerges, the illumination beams 50 of the visual guidance system 10 can also illuminate the water 70, and thus provide additional visual cues to the driver of the boat 40 as to the position underwater of the trailer 20. The visual guidance system 10 thus assists the driver of the boat 40 without requiring any equipment to be specifically mounted to the boat 40. Unlike fixed lights on a boat ramp 60, or other fixed illumination system, the visual guidance system 10 provides real time information to the driver of the boat 40 as to the real time position of the trailer so that the driver of the boat 40 can make the best possible approach to the trailer 20. In a configuration, the visual guidance system 10 can also be controllable using wireless communication means. For example, a signal emitter (not shown) on the boat 40 can provide a signal to a receiver (not shown) on the visual guidance system 10, and can function similarly to how a garage door opening system works. The signal can be optical, wireless, or received through networking as is known in the art. The emitter can transmit a specific signal, and on predetermined time intervals, as long as the boat 40 is in motion in the water 70. The motion of the boat 40 can be sensed by GPS, gyroscopes, or accelerometers as is known in the art. In a configuration, when the signal being transmitted by the boat 40 comes within range of the trailer 20, the visual guidance system 10 can activate and, for example, create a visual path or runway for the boat 40 to follow. Once the boat 40 has been hoisted out of the water, and stops moving independently of the trailer 20, the emitter can stop transmitting and the visual guidance system 10 can deactivate. The emitter can also be triggered to serve as a visual aid for an individual who is searching for a boat trailer, boat dock, boat slip, or boat lift in the dark.

As the trailer 20 enters the water 70 and submerges, the driver of the vehicle 30 can use, in real time, the illumination beams 50 to determine what portion of the trailer 20 is being submerged, and reduce the possibility of accidentally driving the vehicle 30 into the water 70. In an embodiment, the visual guidance system 10 can include a selectable trailer-backing mode (not shown) that projects one or more illumination beams 50 at one or more fixed or selectable distances behind the trailer to assist in backing up and submerging the trailer 20. The illumination beams 50 can include patterns, shading, colors, or other visual cues for assisting the driver of the vehicle 30. It will be appreciated that versions of the visual guidance system can be used for any suitable purpose such as nautical route illumination, including channel markers, creating a visible water runway for amphibious aircraft in nighttime takeoff/landing scenarios, or the like.

Figure 2:
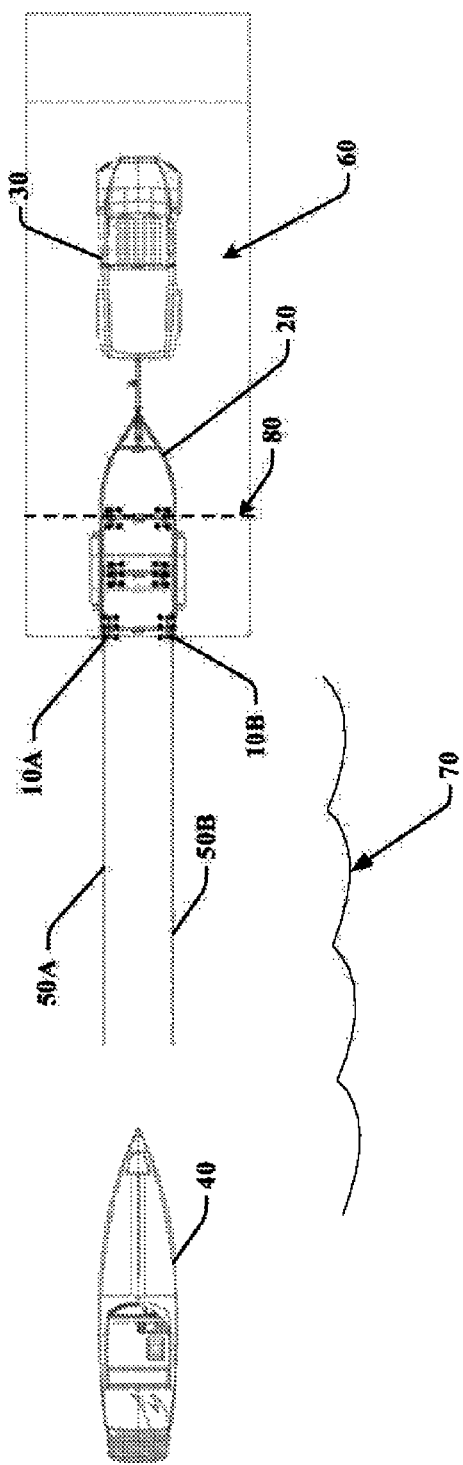
FIG. 2 is a plan view of the visual guidance system of FIG. 1.
Figure 3:
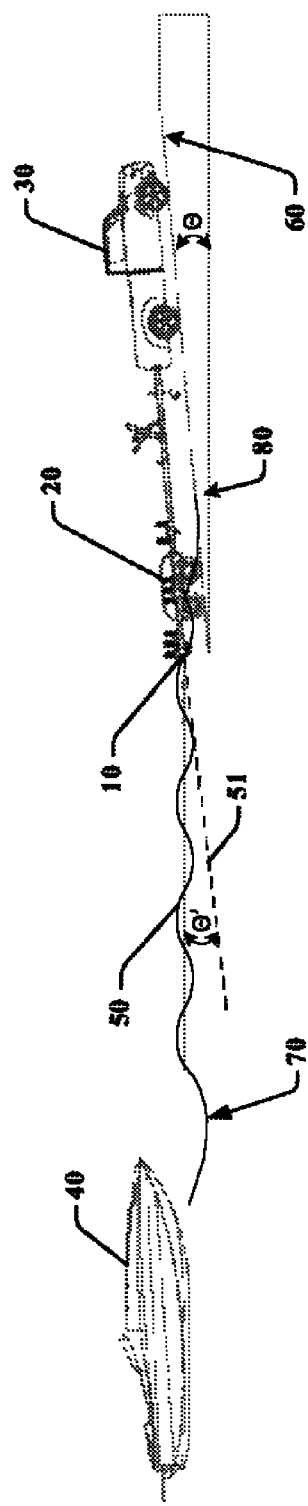
FIG. 3 is a side view of the visual guidance system of FIGS. 1 and 2.

FIG. 2 presents a plan view of the elements of FIG. 1. FIG. 3 presents a side view of the elements of FIGS. 1 and 2. In the side view of FIG. 3, the illumination beams 50 are approximately parallel to the surface of the water 70. Dotted line 51 illustrates the angle θ' that the illumination beams 50 are rotated or pivoted when the trailer 20 is submerged or partially submerged in the water 70, as will be described in the operation of the visual guidance system 10 below.

Figure 4:
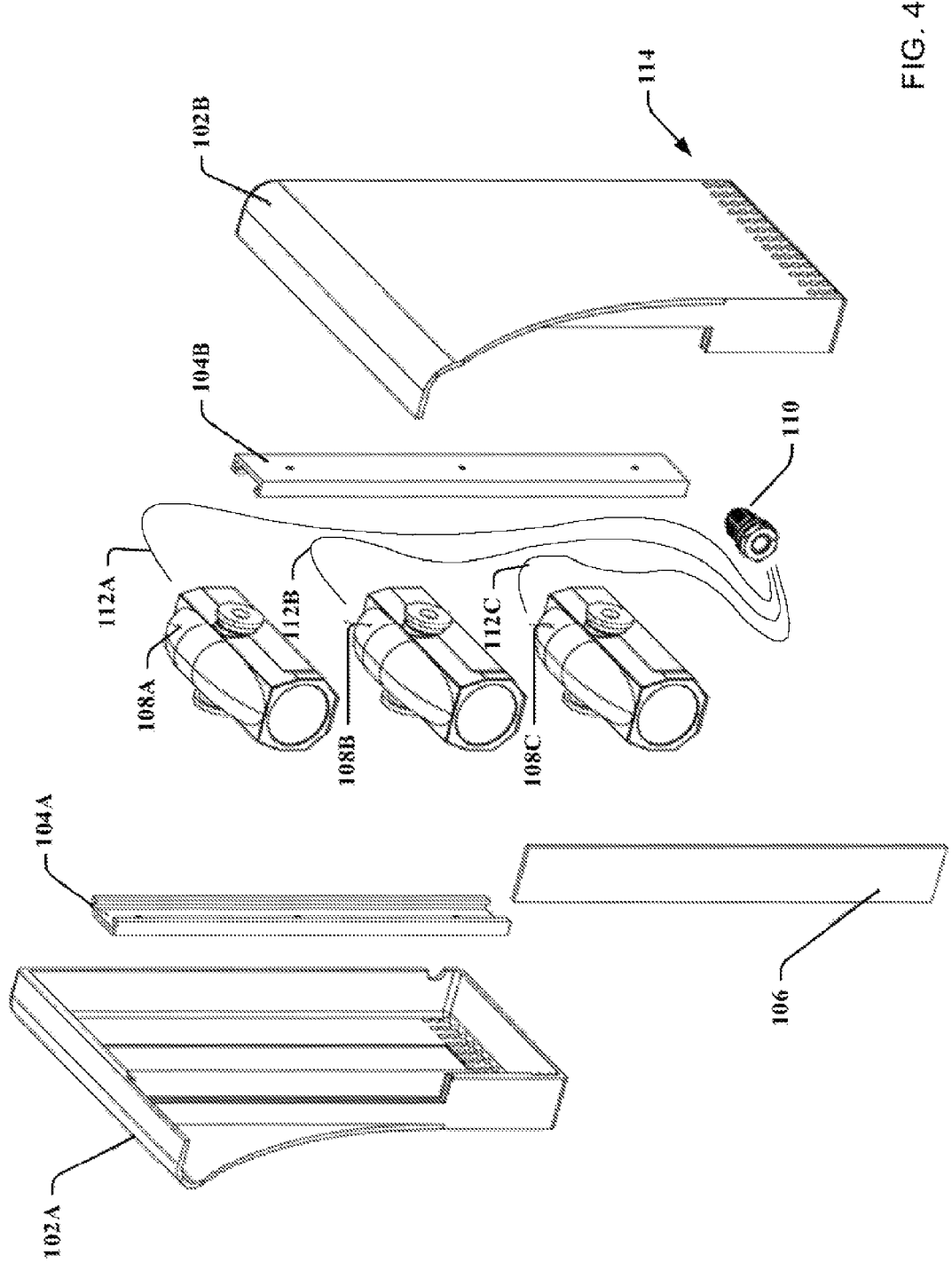
FIG. 4 depicts an exploded view of a unit of the visual guidance system of FIGS. 1-3 according to one embodiment.

Referring now also to FIG. 4, an exemplary unit 100 of the visual guidance system 10 is presented. The unit 100 can comprise a housing 102a and 102b (collectively housing 100), one or more guide tracks 104a and 104b (collectively guide tracks 104), an optical window 106, one or more laser heads 108a, 108b, and 108c (collectively laser heads 108), one or more power connectors 110, and wiring 112a, 112b, and 112c (collectively wiring 112). The wiring can connect the laser heads 108 to the power connector 110. The optical window can be a glass window, or an optically transparent material that is preferably resistant to scratching such as Lexan. The optical window shields the laser heads 108 from the movement of the water but can permit the illumination beams 50 from the laser heads 108 to pass through. Although the unit 100 is illustrated as having three laser heads 108, and the description below details an example operation using three laser heads 108, any suitable number of laser heads 108 can be used including one laser head 108, two laser heads 108, four laser heads 108, and so forth.

The housing 102 can be any suitable material, but can include a high density durable polymer or plastic that is resistant to water such as polyethylene. The housing 102 can be porous to allow water to enter and drain from the housing, for example through openings 114 near the bottom of the housing 102. The openings 114 can include a screen or filter (not shown) that allows only water to pass through the openings 114. The size of the openings 114 can be configured to perform a similar purpose. The screen or filter can be removable for cleaning. By allowing water to enter the housing 108, and in combination with floats in communication with the laser heads 108 as will be presently described, the laser heads 108 can be made to change position and/or orientation as water enters the housing 102.

Figure 5:
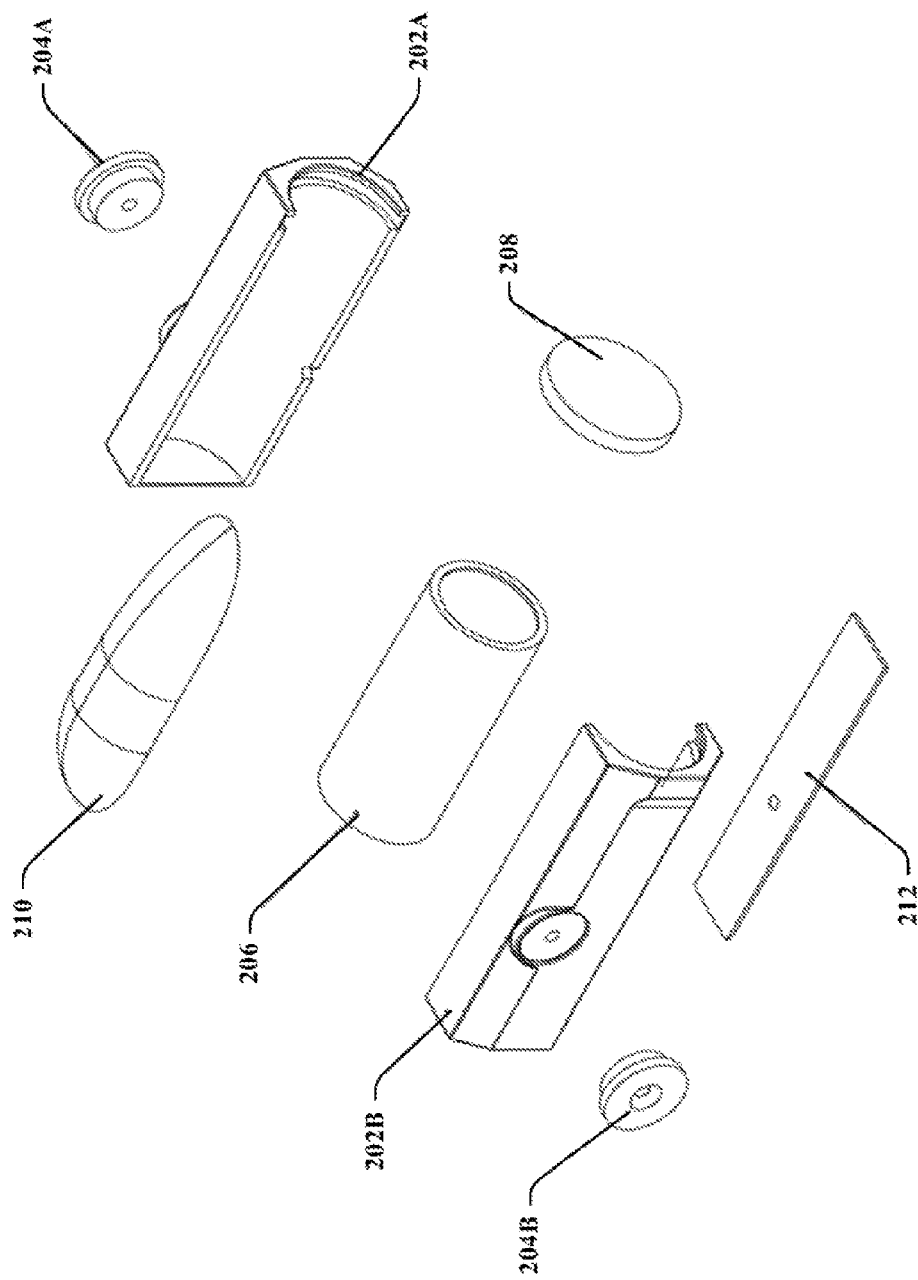
FIG. 5 depicts an exploded view a laser head of FIG. 4 according to one embodiment.

Referring now also to FIG. 5, an exemplary laser head 108 is presented. The laser head 108 can comprise a laser head housing 202a and 202b (collectively laser head housing 202), one or more pivot/slide knobs 204a and 204b (collectively pivot/slide knobs 204), one or more laser modules 206, a collimating lens 208, a float 210, and a balance weight 212. The laser head housing 202 can be any suitable material, but preferably is a high density durable polymer or plastic that is resistant to water such as polyethylene. In a configuration, the laser head housing 202 can include one or more seals (not shown) and be water resistant. In a configuration, the laser module can be cooled by water surrounding the laser head housing 202. A wire 112 (see FIG. 4) can enter from the bottom of the housing to power the laser module 206.

The laser module 206 can be a laser capable of producing a collimated beam of illumination, or illumination beam 50, alone, or in combination with the collimating lens 208. An example laser module can be a 5 mW green laser having a collimated laser beam approximately 3 to approximately 30 mm in diameter. Other colors or combinations of colors, different beam powers, and beam shapes can be used as would be understood in the art. Although the source of the illumination beams 50 is illustrated and describes as a laser module and the illumination beams 50 are described as being laser beams, other suitable sources of light that can produce defined beams of illumination can also be used.

In various embodiments, the pivot/slide knobs 204 can be configured to only allow translation along the guide track 104 (see FIG. 4) without pivoting, the collimating lens 208 can be a non-collimating optical window or lens or include a grating to perform beam shaping, and one or more of the float 210 and balance weight 212 can be absent.

Referring again back to FIG. 4 and also to FIG. 5, as water enters the housing 102, the laser heads 108 can translate and rotate, or pivot, in the guide track 104 as the floats 210 make the laser head 108 buoyant. The balance weight 212 and float 210 for each of the laser heads 108 can be individually configured to perform a particularized function. Referring again back to FIG. 3, in a configuration, the laser heads 108 can be configured to stay parallel and level to the surface of the water, and thus change their angle of orientation approximately by θ' as the housing 102 enters the water. The change of angle θ' allows the laser heads 108 to light a runway path for the vehicle 30 while the vehicle 30 is reversing down the boat ramp 60 into the water 70, but then change configuration to a different angle that is more suitable for guiding the boat 40 to the trailer 20 as the trailer 20 submerges into the water 70.

In a configuration, each of the laser heads 108 can be configured to have a different buoyancy that sets the position of each of the laser heads 108a, 108b, or 108c to a different position relative to the surface of the water 70. For example, laser head 108c can float under the water 70 to present one or more underwater illumination beams 50 that can serve as a runway for guiding the boat 40 to the trailer 20. Water can disperse more light than air due to particulate in the water, and therefore the underwater illumination beams 50 can appear significantly brighter to drivers of the boat 40 than illumination beams 50 in the air. The underwater illumination beams 50 can be positioned at a suitable depth underwater, for example of the water 70. Laser head 108b can be positioned at, or approximately at, the surface of the water 70, and laser head 108a can be positioned above the surface of the water 70 at approximately 10 mm to approximately 150 mm above the surface of the water. Due to water ripples and waves, laser head 108b and laser 108a can create a visible runway on and above the surface of the water 70 that in places reflects off the surface of the water 70 and in places disperses as the illumination beams 50 go through a ripple or wave in the water 70. When configured this way, the laser heads 108b and 108c can interact with ripples and waves in the water to create shifting patterns that can enhance the visibility of the illumination beams 50.

In the configuration detailed above, the laser heads 108 can each translate and pivot in the guide track 104 so as to maintain their respective positions and angles essentially independent of the water level, wave size, wave frequency, submerged depth of the trailer 20, and angle of the trailer 20 on the boat ramp 60. In another configuration, the balance weight 212 and float 210 can be configured to orient each of the laser heads 108 to different angles upon submersion of the housing 102, thereby providing the driver of the vehicle 30 with an additional visual cue as to how far the trailer 20 has submerged in the water 70.

In an embodiment, the laser heads 108 and guide tracks 104 can include latches that secure the laser heads 108 when the trailer 20 is on the road, thus preventing damage to the laser heads 108, and that release the laser heads 108 when the housing 102 is submerged.

In an embodiment, the laser heads 108 can turn on in the presence of water in the housing 102, or as the trailer 20 enters the water 70 (see FIGS. 1-3). In this manner, the visual guidance system 10 can be prevented from activating while the trailer 20 is on the road. In a configuration, the laser heads 108 can switch on only once the housing is submerged to a specific depth. In another configuration, the laser heads 108 can be activated when the vehicle 20 (see FIGS. 1-3) is placed into the reverse gear. In various configurations, the laser heads 108 can be controlled by water sensors, pressure sensors, manual switches, wireless systems, linked to other vehicle systems, and other control means as would be known in the art. In a configuration, the laser heads can be controlled by a controller, for example a computing device such as a dedicated computing device configured to sense conditions and turn on the laser heads 108 as desired by the driver of the vehicle or as configured.

Figure 6:
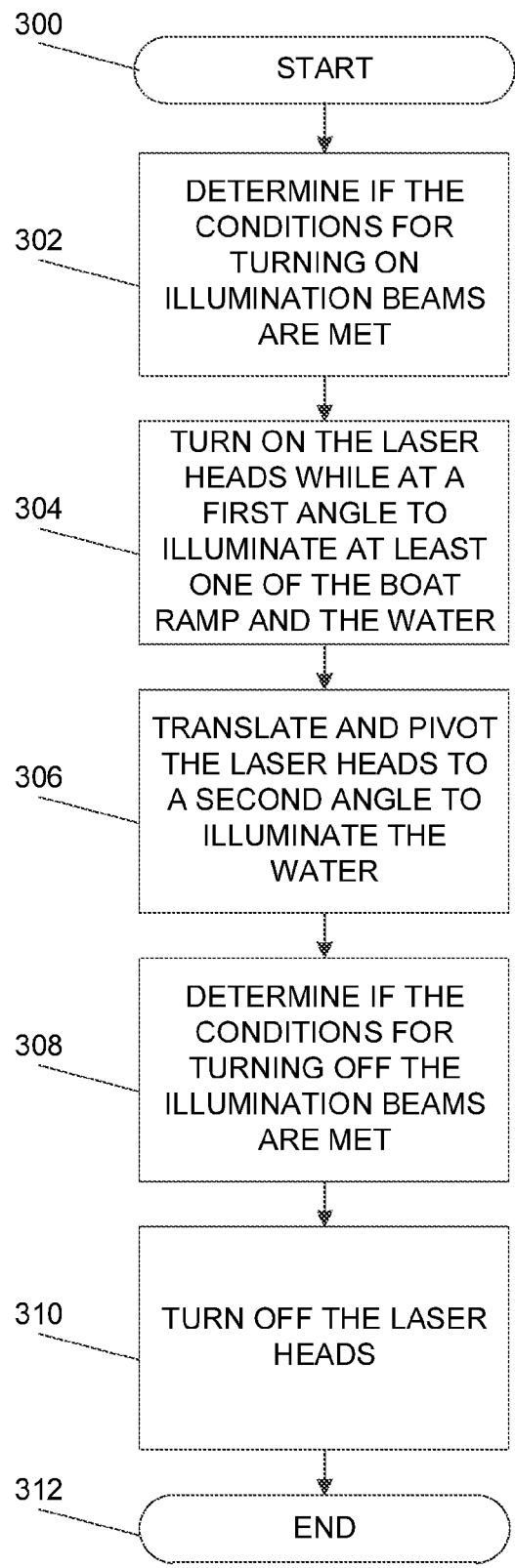
FIG. 6 is an exemplary flow diagram of the operation of a visual guidance system.

Referring now to FIG. 6, an exemplary operation of the visual guidance system is presented. Operation begins at the start block 300. Operation continues to operation block 302. At operation block 302, the visual guidance system determines if the conditions for turning on the illumination beams have been met. As described in the disclosure above, the determining operation can be based upon water being present in the housing of a unit of the visual guidance system, can be based on the driver of the vehicle turning on a switch manually, and can include sensing values of sensors or vehicle systems. The operation continues to operation block 304 where the laser heads can be turned on while at a first angle, and the illumination beams illuminate the boat ramp and/or the water. Operation continues to operation block 306 where, in the presence of water in the housing of the unit of the visual guidance system, the laser heads translate and rotate to a second angle, thereby illuminating the water at a different origination than in operation block 304. Operation continues to operation block 308. In operation block 308, the visual guidance system determines whether to turn off the illumination beams. As described above, the determining operation can be based upon the relative movement of the boat relative to the trailer, can be based on the driver of the vehicle turn off a switch manually, and can include sensing values of sensors and vehicle systems. The operation continues to operation block 310 where the laser heads can be turned off. Operation terminates at end block 312.

Figure 7:
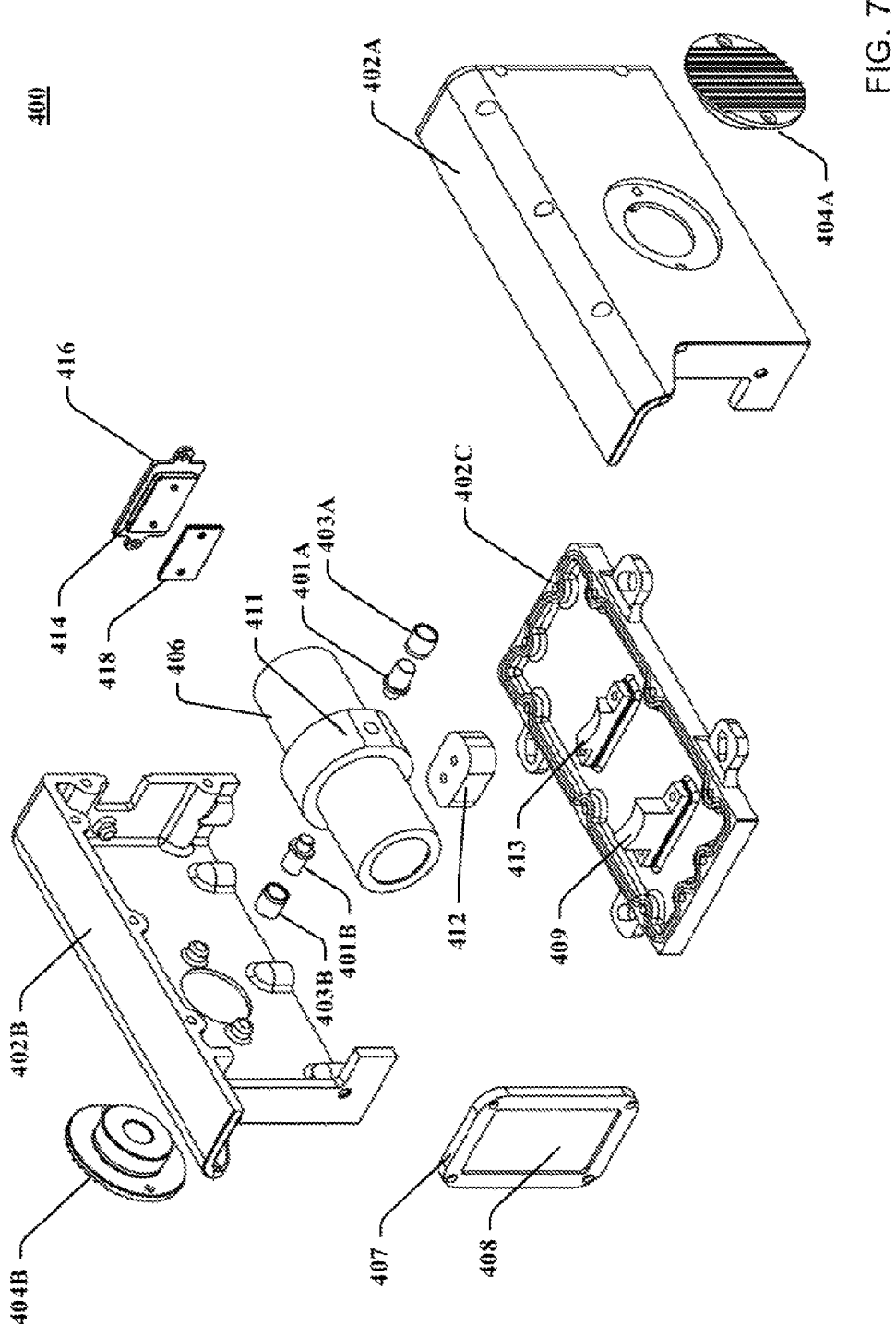
FIG. 7 depicts an exploded view of a laser head according to an alternate embodiment.

Referring to FIG. 7, an alternate embodiment of a laser head 400 is presented. The laser head 400 can comprise a laser head housing 402A, 402B, and 402C (collectively laser head housing 402), one or more heat sinks 404A and 404B (collectively heat sinks 404), one or more laser modules 406, a glass housing 407 that can include a glass panel 408, and a balance weight 412 that can be associated with the housing 402C. The laser head housing 400 can be any suitable material, but can include a high density durable polymer or plastic that can be resistant to water such as polyethylene. In a configuration, the laser head housing 402 can include one or more seals 414 that can be associated with a desiccant replacement window 416 and desiccant 418. The desiccant 418 can reduce the buildup of moisture over time. A wire (not shown), or other suitable power source, can enter from the bottom of the housing to power the laser module 406.

The laser module 406 can be a laser capable of producing a collimated beam of illumination, or illumination beam 50, alone, or in combination with the glass panel 408. An example laser module can be a 5 mW green laser having a collimated laser beam approximately 3 to approximately 30 mm in diameter. Other colors or combinations of colors, different beam powers, and beam shapes can be used as would be understood in the art. Although the source of the illumination beams 50 is illustrated and describes as a laser module and the illumination beams 50 are described as being laser beams, other suitable sources of light that can produce defined beams of illumination can also be used.

In various embodiments, the laser head 400 can include one or more pivot shafts 401A and 401B (collectively pivot shafts 401) that can be coupled with the laser module 406 at about a pivot collar 411. One or more pivot bushings 403A and 403B (collectively pivot bushings 403) can be rotatable relative to the pivot shafts 401 and can be coupled with the heat sinks 404. It will be appreciated that the laser module 406 can be movable relative to the housing 402, can be selectively movable by a user to a desirable position within the housing 402, can be selectively movable by a controller or other system to a desirable position relative to the housing, or can have a fixed position within the housing 402. The heat sinks 404 can prevent overheating the laser diodes that can be associated with the laser module 406 and that can cause condensation buildup. The housing 401C can include a forward rotational shock absorber 409 and a backward rotational shock absorber 413 that can prevent damage from occurring to the laser module 406 during transport, for example. The housing 402 can include a gasket (not shown) or any other suitable feature such that the cavity defined by the housing 402 can be substantially watertight.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A visual guidance system comprising:
 a. an elongated track;

b. a first laser head, the first laser head being coupled with the elongated track, wherein the first laser head is pivotally and vertically moveable relative to the elongated track, the first laser head comprising;
   i. a first housing defining a first housing cavity;
   ii. a first laser module positioned within the housing cavity to provide a first illumination beam; and
   iii. a first float associated with the first laser head such that the first laser head is configured to be buoyed by fluid and is movable along the track in response to changes in fluid height or volume.

2. The visual guidance system of claim 1, wherein the first laser module is a laser from about 5 mW to about 100 mW having a collimated laser beam from about 3 mm to about 100 mm in diameter.

3. The visual guidance system of claim 1, wherein the first laser head further includes a grating to perform beam shaping.

4. The visual guidance system of claim 1, wherein the first laser head is substantially parallel to the surface of the fluid when buoyed by the fluid.

5. The visual guidance system of claim 1, wherein the first laser head is substantially perpendicular to the track when buoyed by the fluid.

6. The visual guidance system of claim 1, wherein the first housing includes a first window.

7. The visual guidance system of claim 1, wherein the first float buoys the first laser head such that the first illumination beam projects substantially along the surface of a body of water.

8. The visual guidance system of claim 1, wherein the first float buoys the first laser head such that the first illumination beam projects substantially below the surface of a body of water.

9. The visual guidance system of claim 1, wherein the first laser head further comprises a balancing weight.

10. The visual guidance system of claim 1, wherein the first illumination beam is activated when the first laser head contacts the fluid.

11. The visual guidance system of claim 1, wherein the first laser module is controlled wirelessly.

12. The visual guidance system of claim 1, further comprising a second laser head, the second laser head being coupled with the track, wherein the second laser head is pivotally and vertically moveable relative to the track and, the second laser head comprising;
   a. a second housing defining a second housing cavity;
   b. second laser module positioned within the second housing cavity configured to provide a second illumination beam; and
   c. a second float associated with the second laser head.

13. The visual guidance system of claim 12, wherein the first laser head is positioned substantially above the second laser head on the track.

14. The visual guidance system of claim 12, wherein the first float buoys the first laser head such that the first illumination beam projects substantially along the surface of a body of water and the second float buoys the second laser head such that the second illumination beam projects substantially under the body of water.

15. The visual guidance system of claim 1, wherein the first laser head further includes at least one shock absorber.

16. The visual guidance system of claim 1, wherein the first laser head further includes a desiccant replacement window and an associated desiccant.

17. The visual guidance system of claim 1, wherein the first laser module is coupled with a pivot collar that is associated with a pivot shaft and a pivot bushing.

18. A visual guidance system comprising:
   a. a guidance system housing;
   b. an elongated track positioned at least partially within the guidance system housing;
   c. a first laser head, the first laser head being coupled with the elongated track, wherein the first laser head is pivotally and vertically moveable relative to the elongated track, the first laser head comprising;
      i. a first housing defining a first housing cavity;
      ii. a first laser module positioned within the housing cavity to provide a first illumination beam; and
      iii. a first float associated with the first laser head such that the first laser head is buoyed by fluid and is movable along the track in response to changes in fluid height or volume.

19. A visual guidance system comprising:
   a. an elongated track;
   b. a first laser head, the first laser head being coupled with the elongated track, wherein the first laser head is moveable relative to the elongated track, the first laser head comprising;
      i. a first housing defining a first housing cavity;
      ii. a first laser module positioned within the housing cavity to provide a first illumination beam; and
      iii. a first float associated with the first laser head such that the first laser head is buoyed by fluid;
   c. a second laser head, the second laser head being coupled with the elongated track, wherein the second laser head is moveable relative to the elongated track and, the second laser head comprising;
      i. a second housing defining a second housing cavity;
      ii. second laser module positioned within the second housing cavity configured to provide a second illumination beam; and
      iii. a second float associated with the second laser head.

20. The visual guidance system of claim 19, wherein the first laser head is positioned substantially above the second laser head on the track.

* * * * *